July 16, 1940.   J. J. CROWE   2,208,212
VARIABLE-SPEED TORCH CARRIAGE
Filed Oct. 24, 1939   2 Sheets-Sheet 1
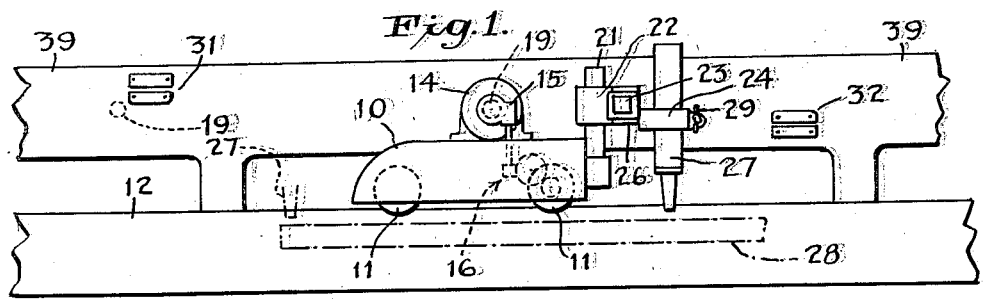
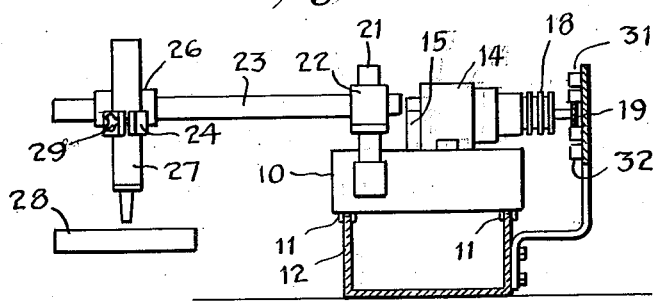
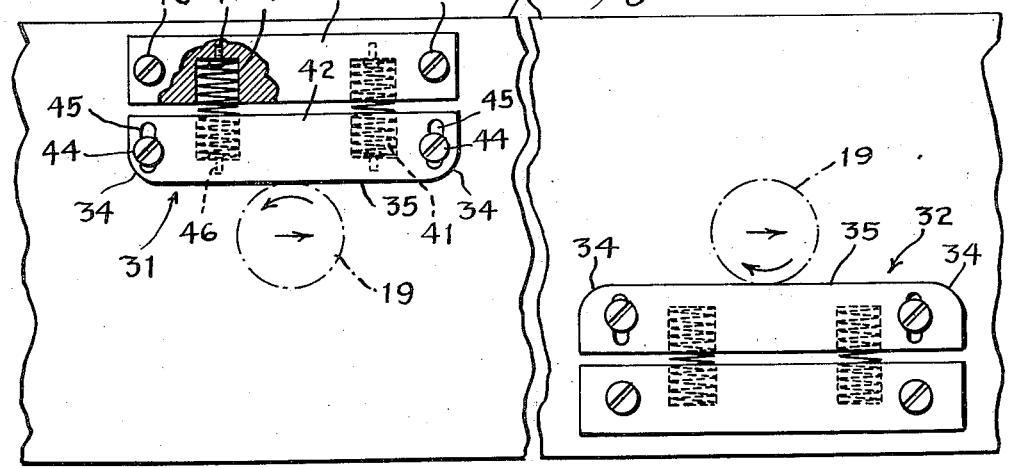
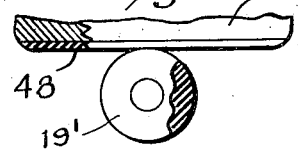
INVENTOR
John J. Crowe
BY
ATTORNEY

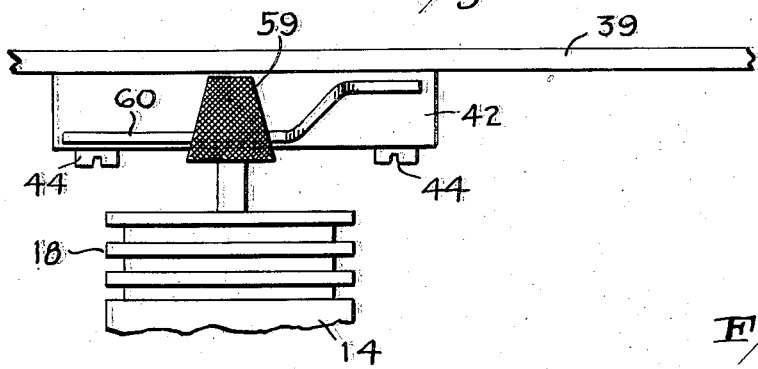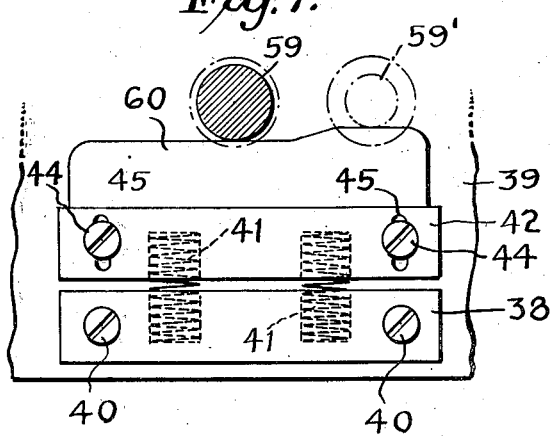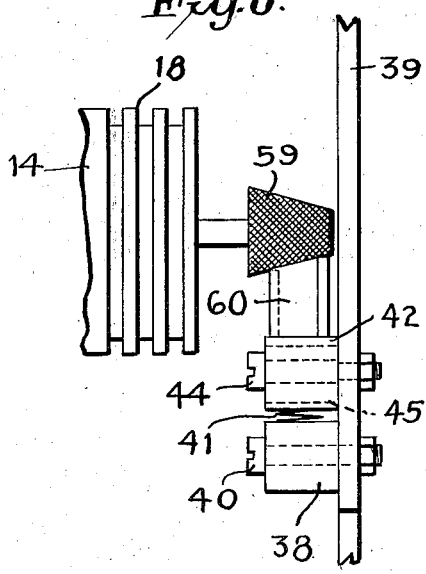

Patented July 16, 1940

2,208,212

UNITED STATES PATENT OFFICE 2,208,212

VARIABLE-SPEED TORCH CARRIAGE

John J. Crowe, Westfield, N. J., assignor to Air Reduction Company, Incorporated, New York, N. Y., a corporation of New York Application October 24, 1939, Serial No. 300,995

12 Claims. (Cl. 266—23)

This invention relates to apparatus for moving a torch, such as a cutting, descaling, or flame hardening torch, along a course at a non-uniform speed.

Differences in a work-piece, particularly variations in the thickness of the piece at different places along its length, require changes in the rate of travel of the torch in order to obtain best results. A change in thickness, and to some extent a change in width, results in an increase or decrease in the mass of metal adjacent the region of heating. This affects the conduction of heat away from the metal that is directly under the torch and thus influences the net heating effect of the torch. The mass of metal near the region of heating is influenced by the proximity of the torch to either end of the work-piece, even with pieces of uniform cross-section.

It is an object of this invention automatically to change the speed of the motor that propels a torch carriage whenever the torch reaches a predetermined region in its movement along the work.

A more specific object of the invention is to change automatically the governor adjustment of a self-propelled torch carriage as the carriage passes certain points along its course of travel.

In the preferred embodiment of the invention a rotary governor adjustment member is located in an exposed position on the torch carriage. Contact devices are located close to the course traversed by the carriage in such positions that the governor adjustment member strikes them and is shifted as the carriage travels past the contact devices.

Since a contact device can be located at any point along the course of the carriage, the carriage speed can be changed at any region where the dimensions of the work-piece make a change in torch speed desirable.

The invention is simple and inexpensive. It can be used to adjust governors of ordinary commercial design, provided only that the adjustment member is in such a position on the torch carriage that it can strike and be moved by a contact device as the carriage passes the device. The preferred embodiment of the invention includes an electric motor, but the invention is not limited to such motors.

Other objects, advantages and features of the invention will appear or be pointed out as the specification proceeds.

In the accompanying drawings, forming part hereof:

Fig. 1 is a side elevation of a torch carriage with the automatic speed control of this invention.

Fig. 2 is an end view of the apparatus shown in Fig. 1.

Fig. 3 is an enlarged view showing the contact elements of Figs. 1 and 2 in detail.

Figs. 4 and 5 are detail views showing modified forms of the invention.

Fig. 6 is a top plan view showing a modified form of the invention in which the rate of change of the velocity is variable.

Figs. 7 and 8 are a front elevation and an end view, respectively, of the modified form of the invention shown in Fig. 6.

A torch carriage 10 is stably supported by four wheels 11 that run along a track 12 formed by the upstanding flanges of a channel beam. In the illustrated embodiment of the invention the carriage 10 is self-propelled by an electric motor which is connected with one or more of the wheels 11 by reduction gearing 15 and other motion-transmitting connections 16.

The speed of the motor 14 is controlled by adjustable apparatus supported from the carriage. This speed control apparatus is preferably a centrifugal governor 18 (Fig. 2) attached to the housing of the motor 14 and adjustable by rotating a knurled knob 19. Turning the knob 19 in one direction influences the governor to increase the motor speed and turning the knob 19 in the other direction causes the governor to decrease the motor speed. Electric motors equipped with such governors are well known in the cutting machine art. A detailed explanation of the construction is not necessary for a complete understanding of this invention, but such a disclosure is included in Patent #2,032,743, dated March 3, 1936.

The carriage 10 has a post 21 to which is clamped a bracket 22. A torch-supporting arm 23 extends from the post 21 and beyond the side of the carriage. A torch-holder 24 is connected to the arm 23 by a torch-holder bracket 26. This bracket is adjustable along the arm 23 to change the spacing of the torch-holder 24 from the side of the carriage.

A torch 27 is held in the split clamp, torch-holder 24 and can be moved up or down in the torch-holder to change the spacing of the torch from a work-piece 28. The torch 27 can be held in any set position in the torch-holder 24 by tightening up a clamping screw 29.

The axis of rotation of the governor adjusting knob 19 extends transversely of the direction of movement of the carriage, and the knob 19 is located some distance beyond the side of the carriage. It is evident, however, that the knob 19 could be situated in various positions and have its axis of rotation extend in different directions, preferably in a plane transverse of the direction of movement of the carriage.

Contact devices 31, 32 are located close to and at spaced points along the length of the track 12 in position to be touched by the knob 19. The contact devices 31, 32 have curved cam surfaces 34 at their ends so that when the knob 19 strikes against either contact device, it pushes the face of the contact device back slightly and rolls along the friction face 35 of the contact device.

The governor adjustment knob 19 can be turned in either direction by locating the contact devices above or below the knob. For example, the contact device 31 is above the knob 19 so that when the carriage is moving toward the right in Fig. 3, the knob 19 is rotated counter-clockwise by its contact with the friction face 35. On the other hand, the same direction of carriage movement causes the knob 19 to rotate clockwise when the contact device is under the knob, as is the case with contact device 32 which touches the lower side of the knob.

The variation in motor speed depends upon how much the knob 19 is turned. Contact devices having friction faces of different length are used to obtain different speed adjustments. In Fig. 3 the face 35 of contact device 31 is shorter than the friction face of the contact device 32. This means that if the carriage speed is increased by the contact device 31 it will be subsequently decreased by the contact device 32 to a rate of travel less than its original speed.

Theoretically it is not necessary that the friction faces 35 be yielding or resilient, that is, capable of retracting when the governor adjustment knob comes into contact with them. As a practical matter, however, there must be some resilience to the contact of the knob 19 with these friction faces in order to prevent the positioning of the contact devices from requiring such precision that the operation of the invention would be unreliable.

In the contact devices 31 and 32 the desired resilience is obtained by making each contact device in two parts with springs between them. The contact device 31 has a back block 38 fixed to a frame 39 by screws 40. Springs 41 partially housed in sockets in the back block 38 extend into sockets in a front block 42 and normally hold the front block spaced a short distance from the back block.

The block 42 is held against endwise displacement by screws 44 that extend through slots 45 in the block 42 and thread into the frame 39. The block 42 is free to slide on the screws 44. The springs 41 are preferably connected at their opposite ends to the blocks 38 and 42 by screw fastenings 46. The construction of the contact device 32 is the same as the contact device 31 already described.

Resilient contact between the governor adjustment roller 19 and the contact devices can be obtained by many expedients other than the spring-pressed block 42. The resilience can be in the motor or governor mounting, or the contact surface or governor adjustment knob can be made of resilient material.

Fig. 4 shows a compressible rubber facing 48 on a block 49 which can be used in place of the contact member 31. A governor adjustment roller 19' that rolls along the rubber facing 48 may be knurled metal like the roller 19 in Figs. 1-3 or may itself be made of rubber as indicated in Fig. 4. With the compressible rubber roller 19' it is not essential that the face of the block 49 be also compressible.

Friction contact is relied upon in Figs. 1-4 and is sufficient to turn the governor adjustment knob, but the invention is not limited to contact devices that move the speed control means by friction contact with the adjustment element. Many other expedients for changing the adjustment can be employed.

Fig. 5 shows a gear wheel 51 in place of the knob 19 of Figs. 1-3. This gear wheel 51 comes into contact with a rack 52 that takes the place of the contact device 31 of Figs. 1-3. With the structure shown in Fig. 5, where friction is not relied upon to turn the governor adjustment, it is not necessary to have resilient contact as in the other forms of the invention because small variations in the spaced relation of gear 51 and rack 52 will not affect the operation.

The modified form of the invention shown in Figs. 6 to 8 differs from the structure shown in Figs. 1-3 in that a tapered adjustment roller 59 is used in place of the cylindrical roller and a special contact element 60 is secured to the top of the front block 42.

The contact element 60 has a top surface much narrower than the width of the tapered face of the roller 59 as shown in Fig. 6. When this top surface is against a large diameter portion of the tapered roller, the rotation of the roller 59 is slower than when the small diameter portion of the tapered roller is rolling on the top surface of the contact element 60.

The amount of governor adjustment can be made as large as desired by extending the length of the contact element 60. The acceleration, i. e., rate of speed adjustment, can be made to vary during an adjusting period by having a curve in the contact element which causes it to touch different diameter portions of the roller 59 at different regions along the length of the contact element.

The springs 41 will push the contact element 60 up against the roller 59 regardless of limited variation in the diameter of that portion of the roller in contact with element 60. Instead of relying upon the springs to shift the contact element, however, the construction shown in Figs. 6-8 has the contact element 60 higher at the regions where it touches smaller diameter portions of the adjustment roller. This variation in height is preferably just equal to the change in the radius of that section of the roller that touches the element 60. The position of the roller 59 when the contact element 60 is against the small diameter portion of the roller is indicated by the reference character 59' in Fig. 7.

The preferred embodiment and some modifications of the invention have been described, but other changes and modifications can be made, and some features of the invention can be used without others.

I claim:

1. The combination with a torch carriage on which is a motor with a governor for holding the motor to a definite speed, of adjustment means for the governor including a member rotatable about an axis transverse of the direction of movement of the carriage, one or more contact devices along the course of movement of the carriage in position to turn the rotatable member of the governor adjustment means as the carriage passes said device.

2. The combination with a torch carriage on which is a motor with a governor for holding the motor to a definite speed, of adjustment means for the governor, means for guiding the course of the carriage, and one or more contact devices close to and spaced along the length of the guiding means in position to be struck by the governor adjustment means to shift said adjustment means as the carriage travels past the contact device.

3. Torch translating apparatus including in combination a movable frame by which the torch is supported, a motor for moving the frame along a course, a governor associated with the motor, adjustment means on the governor for changing the speed to which the governor holds the motor, and automatic means effective to shift the governor adjustment means when the torch-supporting frame reaches a given position along its course of movement.

4. A torch translating mechanism including a carriage with a motor that drives the carriage along a given course, and automatic means effective to change the motor speed when the carriage reaches a predetermined location during its travel along said course.

5. Apparatus for moving a torch across a work-piece at different speeds across different parts of the work-piece, including a track, a wheeled carriage stably supported by the track, an electric motor on the carriage for driving said carriage along the track, a centrifugal governor on the motor, a governor adjusting knob rotatable about an axis extending horizontally and at right angles to the direction of movement of the carriage, said knob being located beyond one side of the carriage, a torch support extending beyond the other side of the carriage, a frame connected with and extending lengthwise of the track, contact devices connected to the frame at spaced regions along the length of the frame and along the course traversed by the governor adjustment knob, each of said contact devices having a yieldable friction face across which the governor adjustment knob rolls as the carriage passes that contact device, each friction face being of a length proportional to the extent of adjustment desired at that region of the carriage travel and being located in position to contact with the knob from either above or below depending upon whether the speed change is to be an increase or a decrease.

6. The combination of a motor-driven torch carriage with means for controlling the speed of travel of the carriage, and a contact member located along the path of movement of the carriage in position to shift the speed control means as the carriage passes.

7. Torch translating apparatus including a motor-driven carriage on which is a speed control means including a member movable about an axis intermediate its upper and lower limits in one direction to cause an increase in the carriage speed, and in the other direction to cause a decrease in the carriage speed, a contact device along the path of travel of the carriage in position to be struck by a part of the movable member above said axis and another contact device along the path of travel of the carriage in position to be struck by a part of the movable member below said axis.

8. Torch translating apparatus including a motor-driven carriage on which is a speed control means including a member movable about an axis intermediate its upper and lower limits in one direction to cause an increase in the carriage speed, and in the other direction to cause a decrease in the carriage speed, and one or more contact devices located along the course of travel of the carriage in the path of a part of the movable member, each contact device being either above or below the axis of said movable member to shift the member one way or the other depending upon whether an increase or decrease in speed is desired at the region of that contact device.

9. The combination with a motor-driven torch carriage including speed-control apparatus with a rotatable adustment member that changes the carriage speed according to the degree of angular displacement of said member, of a contact device in position to turn the rotatable adustment member as the carriage passes the contact device, the length of said contact device being proportional to the change of speed desired at the region where the contact device is located.

10. A torch translating mechanism comprising a carriage with a motor that drives the carriage along a given course, and apparatus effective to change the motor speed when the carriage reaches a predetermined location during its travel along said course, the apparatus including means constructed and arranged to vary the rate of change of speed during the operation of said apparatus.

11. Torch translating mechanism comprising a movable frame by which the torch is supported, a motor for moving the frame along a course, motor-speed control apparatus including adjustment means for changing the motor speed, and automatic means for moving the adjustment means at a variable rate.

12. The combination with a motor-driven torch carriage including speed-control apparatus with a rotatable adjustment member that changes the carriage speed according to the degree of angular displacement of said member, of a tapered roller that constitutes a part of the rotatable adjustment member, and an element with a contact face narrower than the width of the tapered roller and shaped to contact at different points along its length with portions of the roller that are of different diameter to change the rate of angular displacement of said roller.

JOHN J. CROWE.

DISCLAIMER 2,208,212.—*John J. Crowe*, Westfield, N. J. VARIABLE-SPEED TORCH CARRIAGE. Patent dated July 16, 1940. Disclaimer filed April 16, 1943, by the assignee, *Air Reduction Company, Incorporated.*

Hereby enters this disclaimer to claims 1, 2, 3, 4, 6, 10, and 11 in said patent.

[*Official Gazette May 18, 1943.*]